United States Patent [19]

Nakamura et al.

[11] Patent Number: 5,191,487
[45] Date of Patent: Mar. 2, 1993

[54] HELICAL-SCAN-TYPE VTR WITH ECHO EFFECT PLAYBACK

[75] Inventors: Shinji Nakamura, Tokyo; Tomohiro Oshima; Katsuakira Moriwake, both of Kanagawa, all of Japan

[73] Assignee: Sony Corporation, Tokyo, Japan

[21] Appl. No.: 593,270

[22] Filed: Oct. 1, 1990

Related U.S. Application Data

[63] Continuation of Ser. No. 884,351, Jul. 11, 1986, abandoned.

[30] Foreign Application Priority Data

Jul. 17, 1985 [JP] Japan .................. 60-155946

[51] Int. Cl.[5] ............................. H04N 5/93
[52] U.S. Cl. .................. 360/19.1; 358/341; 358/343
[58] Field of Search .......... 360/19.1; 358/310, 335, 358/341, 343; 381/17, 61–63, 119

[56] References Cited

U.S. PATENT DOCUMENTS

| | | | |
|---|---|---|---|
| 4,164,884 | 8/1979 | Kakehashi | 381/63 X |
| 4,232,190 | 11/1980 | Laiacona | 381/119 |
| 4,237,343 | 12/1980 | Kurtin et al. | |
| 4,329,544 | 5/1982 | Yamada | 381/63 |
| 4,352,954 | 10/1982 | Franssen et al. | 381/63 |
| 4,453,186 | 6/1984 | Watatani et al. | 358/341 X |
| 4,542,419 | 9/1985 | Morio et al. | 358/343 X |
| 4,613,912 | 9/1986 | Shibata et al. | 358/341 X |
| 4,625,326 | 11/1986 | Kitzen et al. | 381/63 X |
| 4,725,894 | 2/1988 | Sasaki et al. | 358/310 |

FOREIGN PATENT DOCUMENTS

0036337 9/1981 European Pat. Off. .
0103287 3/1984 European Pat. Off. .
8102957 10/1981 PCT Int'l Appl. .

OTHER PUBLICATIONS

Toshiba Owner's Manual for Video Cassette Recorder-VS36, 1983.
Patent Abstracts of Japan, vol. 4, No. 52, Apr. 18, 1980, p. 127 and JP-A-55 23 687, Feb. 20, 1980.

Primary Examiner—Wayne R. Young
Attorney, Agent, or Firm—Ronald P. Kananen

[57] ABSTRACT

A helical-scan video tape recorder (VTR) records time-axis-compressed PCM audio signals on auxiliary recording tracks on a recording medium and has a synthesization circuit which mixes normal frequency-modulated audio signals (AFM audio signals), recorded on video tracks with video signals, with the time-axis-compressed Pulse-Code-Modulated audio signals (PCM signals) before reproduction through speakers. The PCM audio signals require digital processing for time-axis compression, and so are recorded and reproduced later than the AFM audio signals. Thus, when reproduced, the PCM audio component lags behind the AFM component, resulting in an echo effect. Adjustment of the relative amplitude levels of the two types of audio during synthesization produces acoustical effects that simulate the acoustics of a concert hall.

6 Claims, 6 Drawing Sheets

FIG.2 (A) (PRIOR ART)
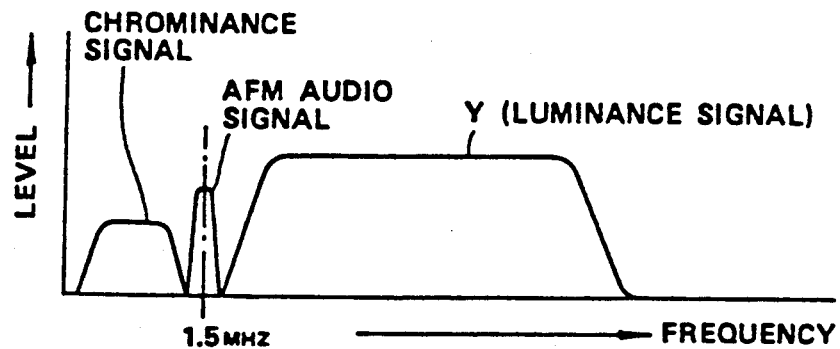
FIG.2 (B) (PRIOR ART)
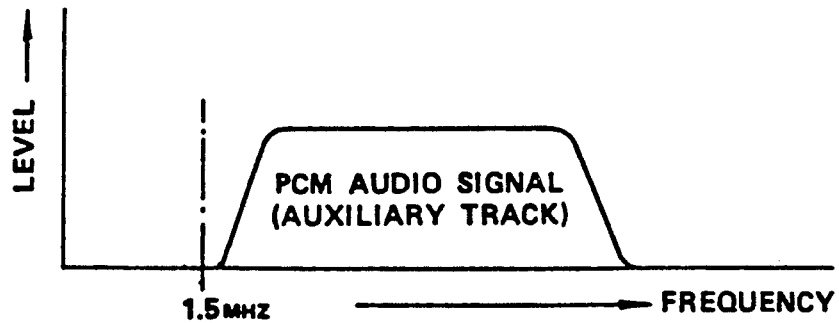

HELICAL-SCAN-TYPE VTR WITH ECHO EFFECT PLAYBACK

This application is a continuation of application Ser. No. 06/884,351 filed Jul. 11, 1986, now abandoned.

BACKGROUND OF THE INVENTION

1. Field of the Invention

The present invention relates generally to a magnetic recording and reproducing apparatus, such as a video tape recorder (VTR), which records a video signal in tracks recorded obliquely on a magnetic tape by means of at least one rotary head. More particularly, this invention relates to a helical-scan-type magnetic recording and reproducing apparatus which can record audio signals on video tracks. Still more particularly, this invention relates to a recording and reproducing technique which provides an echo effect to impart a feeling of presence to a listener.

2. Description of the Prior Art

Conventional helical-scan recording and reproducing apparatus have recording tracks which slant across the magnetic tape and record video signals on the tracks through the use of a rotary head. Since the audio signals are recorded by a stationary head, audio tracks lie along the elongated axis of the magnetic tape. In such magnetic recording and reproducing apparatus (VTR), the rate of feed of the magnetic tape may be reduced to expand the recording time. But when the tape feed rate is reduced, the quality of the audio signals is also reduced. To improve the quality of sound, a magnetic recording and reproducing apparatus has been developed which records the audio signals in the above-described video tracks by means of one or more rotary heads.

FIGS. 1(A) and 1(B) show an arrangement of a rotary drum and magnetic tape in the magnetic recording and reproducing apparatus mentioned above (hereinafter referred simply to as a "VTR") and its recording format on the tracks, respectively. In FIG. 1(A), the VTR includes a rotary drum 1, two rotary heads 2a and 2b, and a magnetic tape 3 wound around a portion of the periphery of the rotary drum 1 by means of guide pins 4 so that the tape 3 contacts the drum 1 over an angle of $180° + \alpha$, where $\alpha \approx 30°$. That rotary contact area is sometimes referred to as the "wrap angle".

The audio signal to be recorded is alternatingly provided from associated recording circuitry to the rotary heads 2a, 2b. As the magnetic tape 3 passes about the rotary drum 1, recording tracks are formed, each of which is longer than the conventional corresponding video tracks A and B by a length a and b corresponding to the angle $\alpha$, as shown in FIG. 1(B). Therefore, the audio signals are recorded in the form of compressed-time-axis pulse-code-modulated (PCM) audio signals on the portions a, b of the tape, sometimes called an auxiliary track. Video signals are recorded in the tracks A and B.

This recording and reproducing method is incorporated in 8 mm video tape recorders. A standard recording method for 8 mm video tape recorders is for the audio signals to be recorded on the main video tracks in the form of a so-called audio-frequency-modulated (AFM) audio signal consisting of a 1.5 MHz carrier wave which is frequency modulated by the audio signal and superposed on the video signal, and its chrominance and luminance signals, as shown in FIG. 2(A). Conventionally, the central frequency for the chrominance signal is 3.58 MHz which is converted to about 688 KHz to occupy the lowest band of the frequency spectrum on the tracks A, B of tape 3. The AFM audio signal occupies the next frequency band, centered at about 1.5 MHz, while the video luminance signal Y occupies the highest frequency band on the tracks A, B. The PCM audio signals are recorded on the auxiliary tracks a, b in a frequency range at about that of the luminance signal Y, as shown in FIG. 2(B).

Hence, in the case of 8 mm video tape recorders, both PCM audio signals recorded on auxiliary tracks a and b and the above-described AFM audio signals on the video tracks A, B can be recorded and reproduced If a stationary head is used, another audio signal component can be added.

However, since the AFM audio signals and the PCM audio signals differ in recording positions on the tape and are demodulated by different methods, these audio signals can only be used as separate musical sources. Such a technique therefore lacks flexibility in application. Usually, an AFM signal is monaural, while a PCM signal is a stereo signal Thus, it would be desirable and pleasing to the listener if the AFM signal thus recorded could simulate a stereo signal to provide a listener with a feeling of presence at the musical source. Such an effect surrounds the listener with sound.

Thus, it is an aim of this invention for such recording and reproducing apparatus to use the PCM signal and the AFM signal from a tape of the type described to provide a "surround effect" by producing an echo during reproduction of the PCM and AFM audio signals.

SUMMARY OF THE INVENTION

It is thus a general object of the invention to provide a VTR which utilizes two different audio signal systems, i.e. PCM and AFM audio signals, to produce audio signals which can give a feeling of presence in a concert hall.

It is another object of this invention to use AFM and PCM signals to simulate stereophonic sounds It is still another object of this invention to provide an echo effect to an AFM signal recorded in a recording medium.

It is still another object of this invention to mix delayed PCM audio signals recorded in a tape of the type described with AFM audio signals having a known delay to add an echo effect to the reproduction of such audio signals.

The above-described objects can be achieved by providing an apparatus for reproducing audio signals recorded in a slant track on a recording medium by a rotary head, the audio signals having two types of signals which are respectively recorded in different portions of the slant track, the apparatus comprising: a) playback means for reproducing respectively the two types of audio signals from the recording medium, one type of which is reproduced with a delay relative to the other, and b) mixing means for combining the two types of audio signals from the playback means to obtain an echo effect.

The above-described objects can also be achieved by providing an apparatus for recording and reproducing signals on a recording medium, comprising: a) a plurality of rotary heads installed on a rotary drum of the apparatus which is capable of recording and reproducing signals on video tracks and on adjacent auxiliary tracks of the recording medium, b) first means for recording a video signal and a frequency-modulated audio signal on the video tracks and for recording a time-axis-compressed pulse-code-modulated (PCM) audio signal on the auxiliary tracks, and c) second means for reproducing the audio signals by combining the frequency-modulated audio signal and the time-axis-compressed pulse-code-modulated (PCM) audio signal.

The above-described objects can further be achieved by providing an apparatus for recording and reproducing video and audio signals on a magnetic tape, comprising: a) a plurality of rotary magnetic heads installed on a rotary drum of the apparatus and which scan obliquely on the magnetic tape which is wound and run on the rotary drum through a given angle to form an auxiliary track and a video track for each field on the magnetic tape, b) a recording system which records a time-axis-compressed and pulse-code-modulated (PCM) audio signal on the auxiliary track and thereafter records the digitally processed video signal and a frequency-modulated audio signal derived from the same musical source as the PCM audio signal on a subsequent video track through the rotary heads for each field, c) a playback system which reproduces the video signal on each video track, the frequency-modulated audio signal on each video track, and the PCM audio signal on each auxiliary track through the rotary heads, and d) a mixing circuit which selects and outputs the reproduced audio signal derived from the playback system from among the reproduced audio signal on each video track, the reproduced PCM audio signal on each auxiliary track, and a combined audio signal of the reproduced audio signals derived from the video and auxiliary tracks.

BRIEF DESCRIPTION OF THE DRAWINGS

A more complete understanding of the present invention may be obtained from the following detailed description taken in conjunction with the attached drawings in which:

FIG. 2A is a graph of the frequency spectrum of recorded signals, including AFM audio signals, on video tracks while FIG. 2(B) shows the frequency range of PCM audio signals recorded on the auxiliary track.;

DETAILED DESCRIPTION OF THE PREFERRED EMBODIMENTS

Figure 1A:
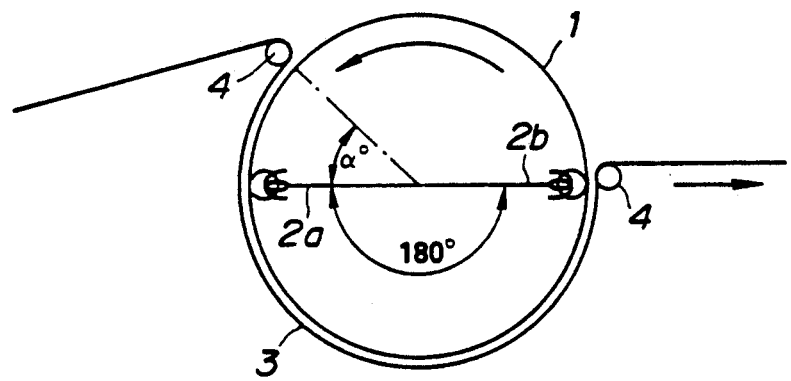
FIGS. 1(A) and 1(B) are diagrams of a rotary drum and a magnetic tape in a conventional helical-scan video tape recorder and of the recording format of the conventional video tape recorder capable of recording a PCM audio signal and an AFM audio signal.
Figure 1B:
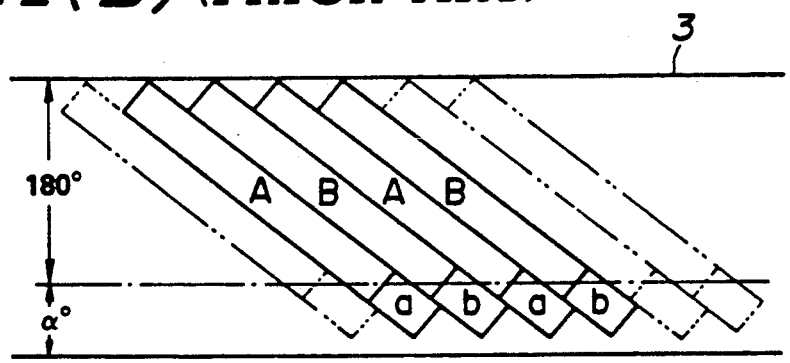
Figure 3A:
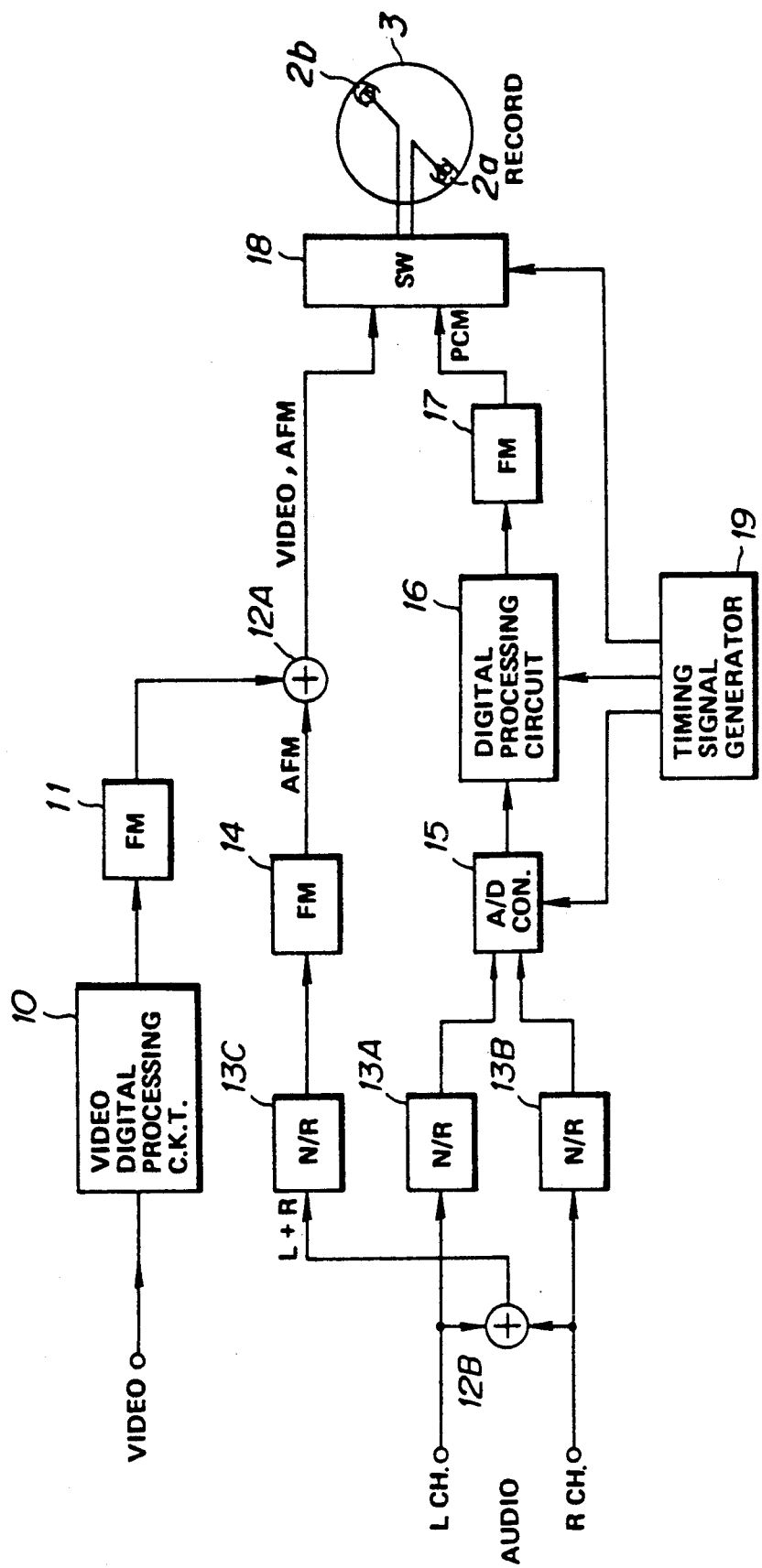
FIGS. 3(A) and 3(B) are circuit block diagrams of a recording and reproducing apparatus (VTR) according to the present invention.
Figure 3B:
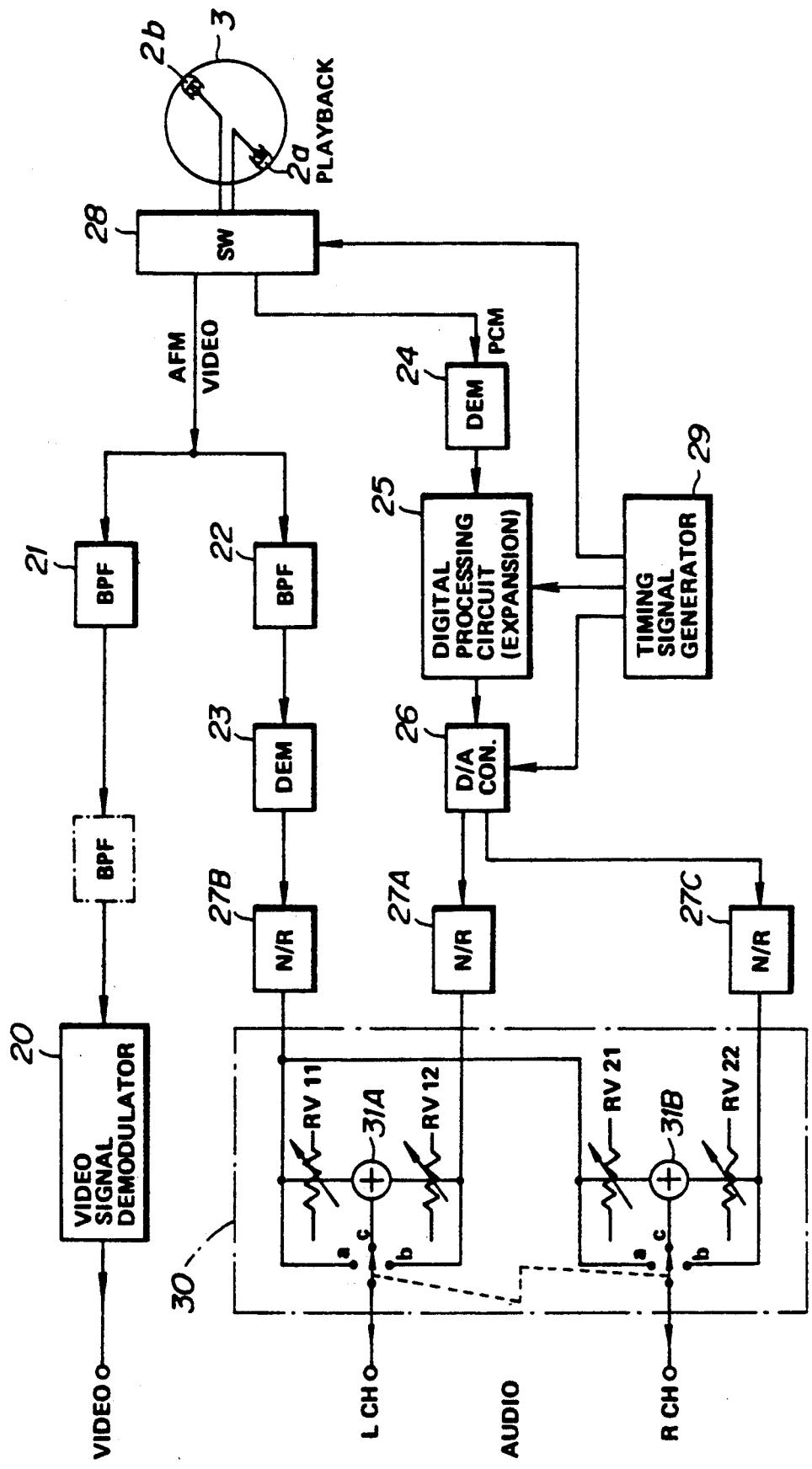

Reference will hereinafter be made to the drawings in order to facilitate an understanding of the present invention. FIGS. 1 and 2 have been discussed above. FIGS. 3(A) and 3(B) thus show diagrammatically a preferred embodiment of a helical-scan magnetic recording and reproducing apparatus (VTR) according to the present invention.

FIG. 3(A) shows the recording system of the VTR in the preferred embodiment. The system includes a video signal processing circuit 10 which includes a video signal amplifier, a clamp circuit and the like for receiving a video signal from a video signal source and providing an output signal to the input of a frequency modulator (FM) 11. The output of the frequency modulator 11 is provided to an addition circuit 12A. A stereo audio signal having a left channel (L CH) and a right channel (R CH) component is provided for recording at an audio input. Noise reduction circuits 13A, 13B and 13C are provided for the respective audio signals to be recorded for a left channel, a right channel and a mixed left and right channel signal. A left and right channel stereo audio signal frequency modulator (FM) 14 is connected to the output of the mixed channel noise reduction circuit 13C and produces an AFM audio signal which is added to the frequency-modulated (FM) signal in the addition circuit 12A.

The AFM audio signal is inputted to a switching circuit 18 together with the frequency-modulated video signal and chrominance signal which has been converted to a low frequency band. These signals are superposed, but occupy distinct frequency bands, as shown in FIGS. 2A and 2B. The AFM audio signal and the FM video signal are then recorded on the video tracks A and B of the magnetic tape 3 by the rotary heads 2a, 2b.

The inputted audio signals in the left and right channels are also converted into corresponding digital signals by means of an analog-to-digital converter 15 (A/D CON) which is connected to receive the outputs of the noise reduction circuits 13A and 13B. Thereafter, the time axis of the digital signals is compressed by a digital processing circuit 16, in which parity and cyclic redundancy check (CRC) codes are added. Furthermore, the signal is processed for frequency interleaving to form the PCM audio signal. The PCM audio signal is then provided from the output of the digital processing circuit to a frequency modulator (FM) 17.

The PCM audio signal is transmitted from the frequency modulator 17 to the switching circuit 18, which is switched in response to a signal from a timing signal generator 19, to the two rotary heads 2a, 2b for recording the PCM audio signal on the auxiliary tracks a, b of the magnetic tape 3. The timing signal generator 19 also controls the operation of the A/D converter 15 and the digital processing circuit 16.

Hence, the same audio signal (from the same musical source) is converted into the AFM audio signal and the PCM audio signal, one being superposed on the video tracks A and B on which the video signal is also recorded and the other is recorded on the auxiliary tracks a, b appended to the corresponding video tracks A and B, as shown in FIGS. 1, 2A, and 2B. It may be noted that the part of the tracks on which the chrominance signal is recorded is omitted from the drawings.

On the other hand, as shown in FIG. 3(B) the signals on the video tracks to be outputted from a switching circuit 28 during reproduction or playback are separated into a video signal component and an AFM audio signal component by means of two band pass filters 21 and 22. The switching circuit 28 is controlled by a timing signal generator 29 during playback. The separated video signal is then outputted through another band pass filter (if necessary, shown in phantom) via a video signal demodulator 20 to a normal video amplifier (not shown) for receiving the separated video output. The separated AFM audio signal is passed to a mixing circuit 30 via a demodulator (DEM) 23 connected to the output of the band pass filter 22 and having its output in circuit with a noise reduction circuit 27B. The PCM audio signal recorded on the auxiliary tracks a, b is also retrieved at times specified by the timing circuit 29. The digital processing circuit 25 receives the PCM audio signal via the demodulator (DEM) 24, and performs error correction on the basis of the parity and CRC codes, time-axis decompression and deinterleaving. The resulting signal is converted into an analog signal by means of a digital-to-analog (D/A) converter 26. Both of the digital processing circuit 25 and the D/A converter 26 are also controlled during playback by the timing signal generator 29. Finally, the converted analog signal is sent to the mixing circuit 30 by way of a pair of noise reduction circuits 27A and 27C.

The mixing circuit 30 includes a switching circuit which selects the demodulated AFM audio signal from the noise reduction circuit 27B, the PCM audio signal from the noise reduction circuits 27A, 27C, or left and right channel signals mixed from both audio signals via addition circuits 31A, 31B. The mixing circuit 30 further comprises two variable resistors RV11 and RV12 for the left channel (LCH) audio output and two variable resistors RV21 and RV22 for the right channel (RCH) audio output. The resistor RV11 controls the AFM signal content mixed by the addition circuit 31A in the right channel, while the resistor RV21 controls the AFM signal mixed in the right channel addition circuit. The resistors RV12 and RV22 similarly control the mixing of PC analog signals in the circuits 31A, 31B in the left and right channels.

Since the helical-scan VTR according to the present invention can produce a combined (stereo) signal made up of both AFM and PCM audio signals, the audio output can simulate the acoustics of live sound production, as explained below.

Figure 4:
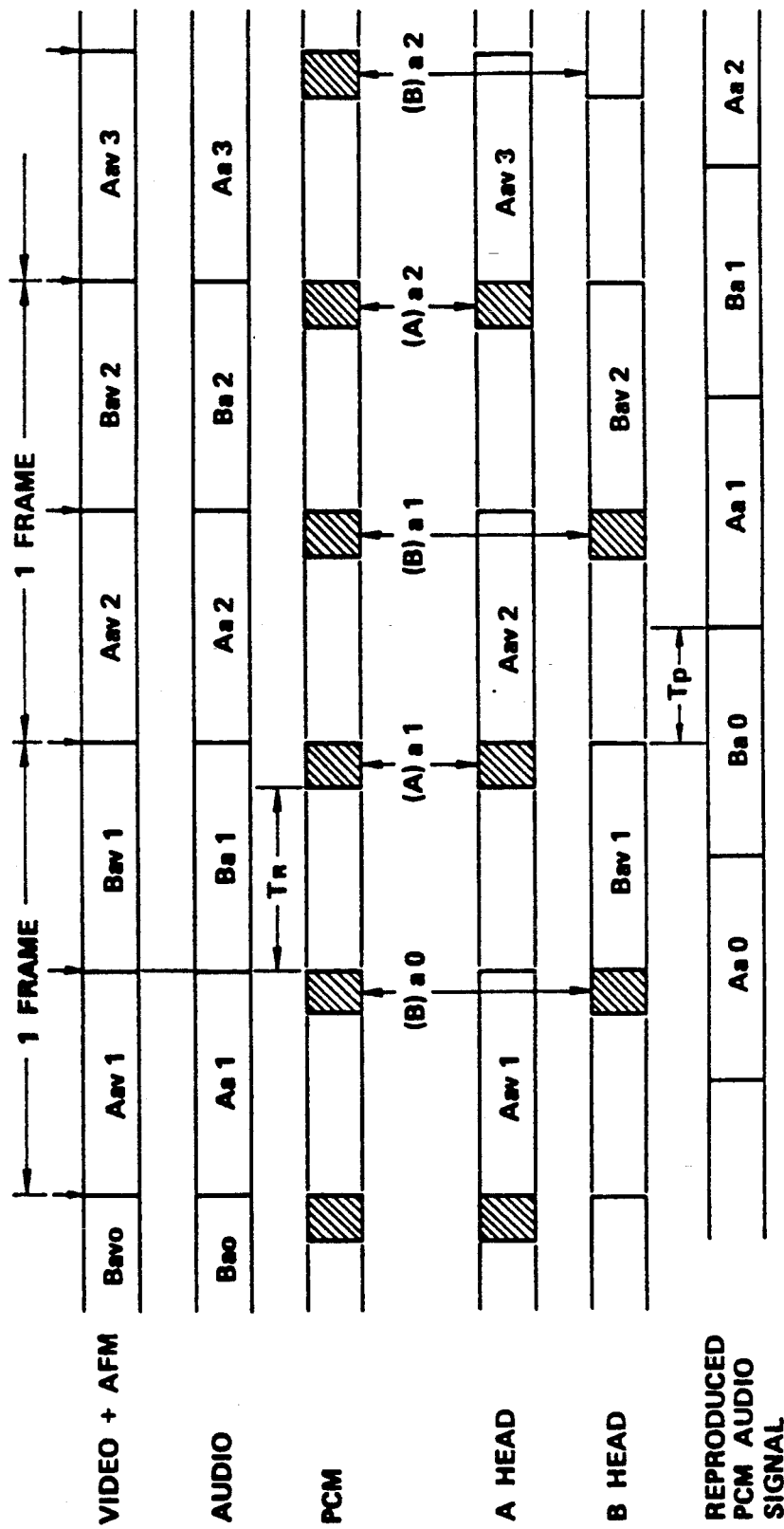
FIG. 4 is a waveform chart showing a delay of the PCM audio signals with respect to the AFM audio signals.

As shown the chart of in FIG. 4, the two rotary heads record each of the frames of the video signal plus an AFM audio signal $Aav_1$, $Bav_1$, ... sequentially so that they are recorded alternatingly on tracks An, Bn. Such a sequence is shown in the row labeled VIDEO+AFM, for each of several representative frames. Each frame thus comprises an A field and a B field. However, since it is necessary to record the PCM audio signal in a way which is time-compressed by at least a factor of six on the auxiliary tracks a, b, the audio signal $Aa_1$ (shown in the row labeled AUD10) in the $Aav_1$ field becomes a signal $(A)a_1$ delayed by a period $T_R$ with respect to the phase of the audio signal $Aa_1$ in order to allow interleaving, time-axis compression of the audio signal $Aa_1$ and addition of the CRC and parity codes during recording. The time compression of the PCM audio signal is shown in the row labeled PCM.

The comprised PCM audio signal $(A)a_1$ is then recorded on the auxiliary track a, b adjoining the track A, B for the video along with AFM signals in the $Aav_2$ field so as to have a delay of about one field with respect to the $Aav_1$ field. Such a recording method is shown in the row labeled A HEAD. Similarly, signals in the B field for each frame are time compressed and recorded, as shown on the chart for the signals $Bav_1$, $Ba_1$, and $(B)a_1$ recorded on the B HEAD track.

During reproduction, the rotary head 2a continuously reproduces the signal $(A)a_1$ and the video signal plus AFM audio signal $Aav_2$. Since the PCM audio signal derived from auxiliary track $(A)a_1$ must be time-axis expanded, deinterleaved, and error corrected by the digital processing circuit 25 as shown in FIG. 3(B), the PCM audio signal is finally converted into the original analog audio signal $Aa_1$ after a time delay of Tp, as shown in the row labeled REPRODUCED PCM AUDIO SIGNAL. Thus, the PCM audio signal recorded on the auxiliary track is reproduced after a total delay of about one frame and a half field ($2\frac{1}{2}$ fields) with respect to the AFM audio signal recorded on the video track.

Hence, if the two audio signals derived from the same musical source are mixed at an appropriate level ratio by the mixing circuit 30 of FIG. 3(B), the resulting sound includes an echo component which provides a surround effect and gives a listener an impression of presence in a concert hall.

Figure 5:
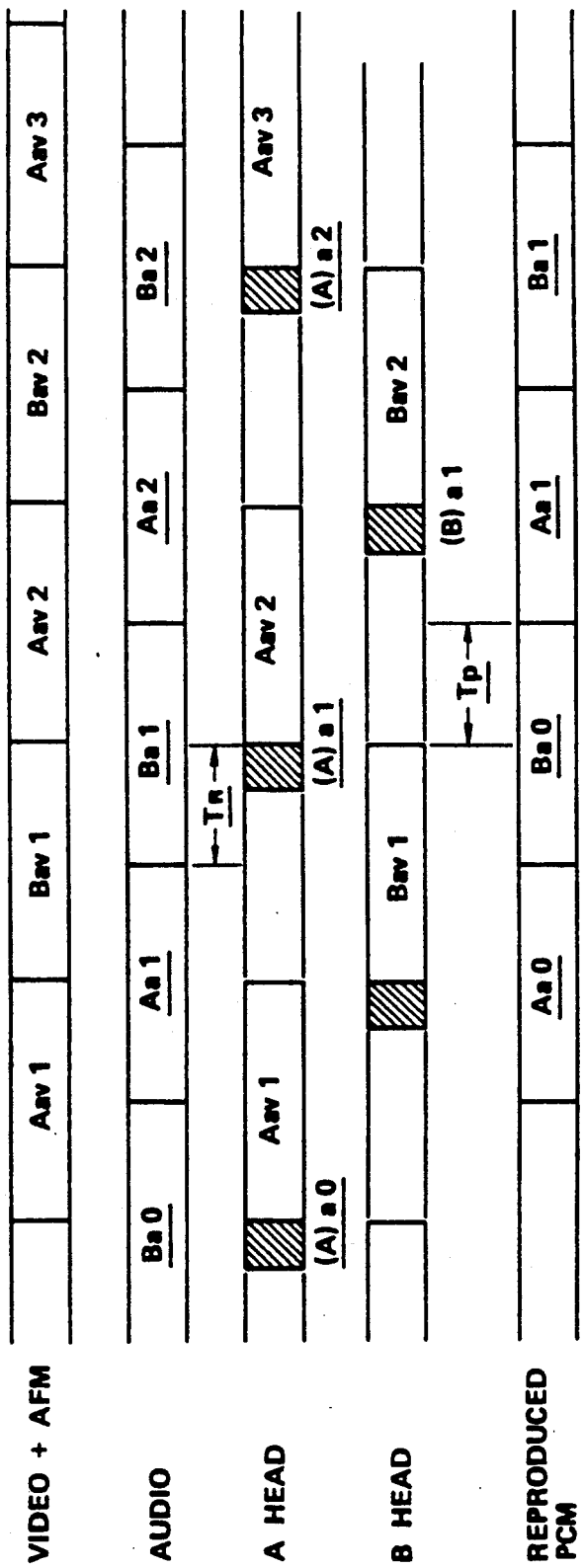
FIG. 5 is a waveform chart showing another example of the signal phase-delay shown in FIG. 4.

The delay of the PCM audio signal with respect to the AFM audio signal is a natural consequence of the digital processing. However, as shown in FIG. 5, the audio signal before the PCM time compression $^Aa1$ may previously start at an intermediate point of one video field and end at an intermediate point in the next field by means of and under control by the timing signal generator 19. Even in this case, if the audio signals are digitally processed for recording within the period $T_R$, and digitally processed for reproduction within the period Tp, the delay with respect to the AFM audio signal reproduced from the video track can be reduced to about two fields. Hence, the phase difference between the AFM audio signal and PCM audio signal during reproduction can be adjusted so that the degree of echo effect can be adjusted.

As described hereinabove, the helical-scan VTR according to the present invention is provided with a mixing circuit so that an audio output with the feeling of the presence in a concert hall can be achieved. This special acoustical effect can also give the impression of a wider video screen.

It will clearly be understood by those skilled in the art that the foregoing description is made in terms of the preferred embodiment and various changes and modifications may be made without departing from the scope of the present invention which is to be defined by the appended claims.

What is claimed is:

1. An apparatus for recording and reproducing signals on a recording medium, comprising:
   a) a plurality of rotary heads installed on a rotary drum of the apparatus which is capable of recording and reproducing signals on video tracks and on adjacent auxiliary tracks of the recording medium;
   b) first means for recording a video signal and a frequency-modulated audio signal on the video tracks and for recording a time-axis-compressed Pulse-Code-Modulated audio signal on the auxiliary tracks; and
   c) second means for reproducing audio signals by combining the frequency-modulated audio signal and the Pulse-Code-Modulated audio signal, wherein said second means includes means for selectively processing the audio signals to have at least a first and a second degree of phase offset.

2. An apparatus for recording and the reproducing video and audio signals on a magnetic tape, comprising:
   a) a plurality of rotary magnetic heads installed on a rotary drum of the apparatus and which scan obliquely on the magnetic tape which is wound and run on the rotary drum through a given angle to form an auxiliary track and video track for each field on the magnetic tape;

b) a recording system which records a time-axis-compressed and pulse-code-modulated (PCM) audio signal on the auxiliary track and records a digitally processed video signal plus a frequency modulated (FM) audio signal derived from the same source as the pulse-code-modulated (PCM) audio signal on the video track through the rotary heads for each field;

c) a playback system including playback means for reproducing the video signal on each video track, the frequency-modulated audio signal on each video track, and the pulse-code-modulated audio signal on each auxiliary track through the rotary heads; said pulse-code modulated audio signal and said frequency modulated signal being reproduced with a relative phase difference;

d) a mixing circuit having mixing means for mixing the reproduced audio signal derived from each video track with the reproduced pulse-code-modulated audio signal derived from each auxiliary track and switching means for selectively switching among the reproduced audio signal derived from each video track, the reproduced pulse-code-modulated audio signal derived from each auxiliary track, and a mixed signal derived from the mixing means and for outputting the selected audio signal;

e) wherein said playback means provides the phase difference between the frequency-modulated audio signal recorded on each video track and the pulse-code-modulated audio signal reproduced from each auxiliary track and corresponds to about 2½ fields when the audio signals to be recorded on each video and auxiliary track are derived from a common source.

3. The apparatus according to claim 2, wherein said playback means variably provides the given phase delay for the pulse-code-modulated audio signal relative to the frequency-modulated signal.

4. An apparatus for recording and reproducing video and audio signals on a magnetic tape, comprising:

a) a plurality of rotary magnetic heads installed on a rotary drum of the apparatus and which scan obliquely on the magnetic tape which is wound and run on the rotary drum through a given angle to form an auxiliary track and video track for each field on the magnetic tape;

b) a recording system which records a time-axis-compressed and pulse-code-modulated (PCM) audio signal on the auxiliary track and records a digitally processed video signal plus a frequency modulated (FM) audio signal derived from the same source as the pulse-code-modulated (PCM) audio signal on the video track through the rotary heads for each field;

c) a playback system including playback means for reproducing the video signal on each video track, the frequency-modulated audio signal on each video track, and the pulse-code-modulated audio signal on each auxiliary track through the rotary heads; said pulse-code modulated audio signal and said frequency modulated signal being reproduced with a relative phase difference;

d) a mixing circuit having mixing means for mixing the reproduced audio signal derived from each video track with the reproduced pulse-code-modulated audio signal derived from each auxiliary track and switching means for selectively switching among the reproduced audio signal derived from each video track, the reproduced pulse-code-modulated audio signal derived from each auxiliary track, and a mixed signal derived from the mixing means and for outputting the selected audio signal;

e, means for providing a phase delay, which corresponds substantially to a half field, for the audio signal to be recorded on an auxiliary track with respect to the audio signal to be recorded on the video track so that the phase difference occurs between the audio signal to be recorded on each video track and that reproduced from each auxiliary track.

5. An apparatus for reproducing audio signals recorded in a track of a recording medium wherein audio frequency modulated (AFM) signals are recorded in a first track and pulse-code modulated (PCM) signals are recorded in an auxiliary track, said apparatus comprising:

means for retrieving said audio-frequency modulated signals from said recording medium and providing a first audio signal representative thereof;

means for retrieving said pulse-code-modulated signals from said recording medium and providing a second audio signal representative thereof, in a way that said first and said second audio signals are relatively delayed in phase during retrieving with respect to each other; and means for mixing said first audio signal and said second audio signal to produce an echo effect related to said delayed phase, wherein said mixing means combines said audio-frequency-modulated and pulse-code-modulated signals reproduced by said retrieving means with a variable phase offset.

6. An apparatus for reproducing audio signals recorded in a track of a recording medium wherein audio-frequency modulated (AFM) signals are recorded in a first track and pulse-code modulated (PCM) signals are recorded in an auxiliary track, said apparatus comprising:

means for retrieving said audio-frequency modulated signals from said recording medium and providing a first audio signal representative thereof;

means for retrieving said pulse-code-modulated signals from said recording medium and providing a second audio signal representative thereof, in a way that said first and said second audio signals are relatively delayed in phase during retrieving with respect to each other; and means for mixing said first audio signal and said second audio signal to produce an echo effect related to said delayed phase, wherein said mixing means combines said audio-frequency-modulated and pulse-code-modulated signals reproduced by said retrieving means with a variable phase offset and wherein said pulse-code-modulated signals are recorded on said auxiliary track with a phase delay relative to said audio-frequency-modulated signals on said first track, both of said retrieving means cooperating with said mixing means so that a phase difference is reproduced upon playback.

* * * * *